Patented May 9, 1939

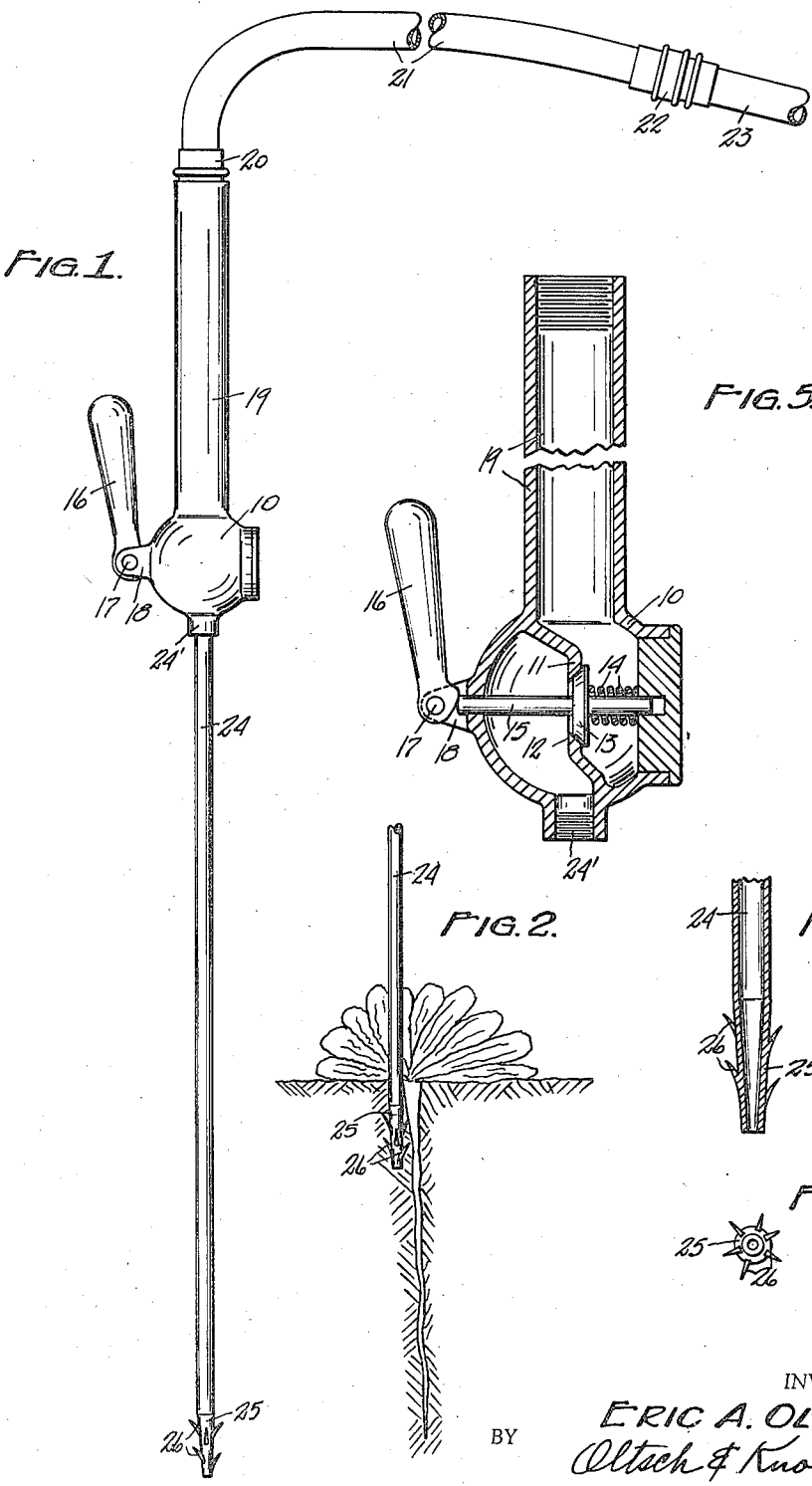

2,157,915

UNITED STATES PATENT OFFICE 2,157,915

WEED EXTRACTOR

Eric A. Olson, South Bend, Ind.

Application July 21, 1937, Serial No. 154,860

4 Claims. (Cl. 47—49)

This invention relates to improvements in weed extractors, and particularly to a device for extracting weeds from a garden or lawn.

Various types and constructions of devices for extracting and pulling weeds have heretofore been devised and constructed. Most of these have been provided with parts adapted to be forced into the ground adjacent the root of the weed and then manipulated to grip, impale or otherwise engage the root so that it may be pulled out by force. Those extractors with which I am familiar have proven inadequate by reason of the fact that they break the weed root at or adjacent the point of engagement, thus leaving a portion of the root undisturbed, from which the weed may grow anew. Many types of weed, such as the dandelion, have roots of great length and are comparatively thin or narrow. This type of weed consequently has little strength in its root to enable it to sustain the pull necessary to dislodge it from the earth which is closely and tightly packed about its great length (frequently over three feet). Even weeds whose roots are thicker and shorter than the dandelion root are frequently of insufficient strength to sustain, without breaking, the pull required to completely dislodge them from the earth packed therearound. Also, it will be seen that the natural strength of a root is impaired or reduced by the breaking of the fibers thereof incident to gripping or impaling the same sufficiently to exert the required disloding force upon the root.

It is, therefore, the primary object of my invention to provide a weed extractor with means for effectively loosening the earth about a weed root before exerting, withdrawing or extracting force thereon.

A further object is to provide a weed extractor with means for directing water under pressure into the ground adjacent the root of the weed to be extracted.

A further object is to provide a weed extractor having a tapered high pressure water nozzle adapted to be inserted into the ground adjacent the root of a weed and having means on the nozzle for engaging the weed root.

Other objects will be apparent from the description, drawing and claims.

In the drawing:

Fig. 1 is a side view of the device conditioned for use.

Fig. 2 is a fragmentary view illustrating the manner in which the device is used.

Fig. 3 is an enlarged longitudinal sectional view of the nozzle.

Fig. 4 is an enlarged end view of the nozzle.

Fig. 5 is a fragmentary longitudinal sectional view of the device, including the control valve.

Referring to the drawing, which illustrates the preferred embodiment of the invention, the numeral 10 designates a valve casing of the conventional globe valve type having a partition or wall 11 therein substantially parallel and intermediate the intake and outlet and provided with a valve seat 12. Valve 13 is pressed against said seat by spring 14 and has a valve stem 15 to guide the valve, one end of said stem 15 projecting from the casing adjacent a cam lever 16 pivoted at 17 to ears 18 projecting from the casing. The intake side of the valve is provided with an elongated tubular portion 19 which constitutes a handle for the extractor. This portion 19 is interiorly threaded at its end to receive a fitting 20 mounted on the end of a flexible hose 21, said hose having a fitting 22 at its other end for connection with a garden hose 23.

The threaded outlet opening 24' of casing 10 is preferably of reduced diameter to mount the end of an elongated tubular steel nozzle 24 whose outer or free end is tapered at 25. A plurality of prongs 26 project from the tapered nozzle end 25, and are preferably inclined at an acute angle in an upward direction, i. e., toward casing 10.

In the use of the device, the casing 10 is grasped in the hand, and the nozzle is forced into the ground in a substantially vertical position closely adjacent the root of the weed to be extracted, and to a depth of several inches to completely imbed the tapered portion. The valve handle 16 is preferably pressed to open the valve 12 as the nozzle is being forced into the ground to facilitate the pressing of the nozzle to place and to prevent clogging of the nozzle opening by the dirt. The valve is held open for a short interval after being inserted into the ground so that water from the nozzle forces its way into the earth around and adjacent the root to loosen the earth. The nozzle is then tilted or otherwise manipulated to bring one or more of the prongs against the root of the weed, and is then raised in a movement which forces the prongs into the root. During this interval the water continues to run, the manipulation of the nozzle insuring proper direction of the flow thereof around the root. A light initial upward pull is then sufficient to dislodge the root from the imbedding earth and provide a passage for water throughout the length of the root, so that the root is readily completely freed from the earth by the washing and loosening action of the water, and can be withdrawn or extracted intact by a second slight pull exerted through the prongs 26.

It will be observed that nozzle tube 24 is of comparatively small diameter, and that the opening of the tapered nozzle end is also small. This increases the pressure of the water stream ejected from the nozzle sufficiently to effect the desired loosening of the earth into which it is directed to the desired or required depth as will be obvious. The small size of the nozzle opening also prevents clogging thereof by small stones and the like as it is forced into the ground. The high pressure of the water stream also insures a directed and localized loosening of the earth, and prevents washing away of more earth than is necessary to extract the weed root, thereby preventing damage to surrounding turf or to the roots of adjacent plants, flowers or shrubs. The length of time the water is required to run to effect the loosening of the earth necessary for extraction of any root depends upon the type of weed and the size and depth of the root, but the high pressure action of the water takes but a few seconds for the most difficult weeds. Another advantage of the device is that the extracted root, in addition to removal intact, is substantially clean washed, so that none of the earth is removed therewith and hence no large and objectionable holes are left in the ground after the weed is removed.

It will be understood that the device is susceptible of various other modifications and embodiments not illustrated, which fall within the spirit of the invention.

I claim:

1. A weed extractor comprising a water line, a nozzle carried by said water line and adapted to be forced into the ground, and impaling members projecting laterally from the end portion of said nozzle.

2. In a weed extractor, a nozzle comprising an elongated rigid metal tube having a tapered outlet end with a comparatively small orifice and impaling members projecting from said tapered end and inclined thereto in the direction opposite said outlet.

3. A weed extractor comprising a water line, a valve connected to said line and including a casing, a rigid tube carried by said casing and being of smaller diameter than said line, said tube having a tapered reduced end, and impaling members projecting laterally from said tube at said tapered end.

4. A weed extractor comprising a water line, a high pressure water nozzle connected to said line and adapted to be forced into the ground, and means carried by said nozzle for engaging a weed root to accommodate extraction thereof.

ERIC A. OLSON.